July 12, 1960

G. C. DE MALVILAIN 2,944,481

EMBOSSING PRESS

Filed Oct. 10, 1958

INVENTOR.
*Gilbert C. de Malvilain*
BY
*Pollard, Johnston, Smyth & Burton*

United States Patent Office 2,944,481
Patented July 12, 1960

---

2,944,481

EMBOSSING PRESS

Gilbert C. De Malvilain, 8 Terrace Court, Port Chester, N.Y.

Filed Oct. 10, 1958, Ser. No. 766,618

18 Claims. (Cl. 101—27)

The present invention relates to the art of embossing, and particularly to a new and improved press including hydraulically operated, flexible diaphragm means that is adapted to coact with a rigid, electrically heated die member.

The principal object of this invention is to provide an apparatus for embossing various materials such as leather, paper, flexible plastics and the like in which efficient, high capacity embossing can be produced by an apparatus of comparatively low cost.

Another object of this invention is to provide such an apparatus in which relatively low cost dies may be employed, and sharp, crisp embossing of uniform depth can be produced.

Another object of this invention is to provide such an embossing apparatus in which relatively high cycle rates of operation can be effected.

Another object of the invention is to provide an embossing apparatus in which an inexpensivve, leak-proof, hydraulically operated, flexible diaphragm cooperates with a die to effect the embossing.

Another object of the invention is to provide such an embossing apparatus in which a relatively movable diaphragm head is clamped to a die base by loosely fitting members that are cam operated into tightly fitting relation.

Another object of this invention is to provide an embossing apparatus including a hydraulically operated, flexible diaphragm that is supplied by liquid from a system including a hydraulic pressure booster.

Another object of this invention is to provide an embossing apparatus in which a flexible diaphragm cooperates with a die to produce an embossing operation, and which diaphragm is sealed against leakage by means that is directly proportional to the pressure liquid employed.

One aspect of the invention may be to provide a base for supporting a die over which the material to be embossed may be placed. A movable head may be provided which may be moved into and out of cooperating position relatively to the die on the base. The head may be provided with a cavity for receiving a flanged, open-mouth, container-like diaphragm. This diaphragm may be held in place by a plate within the diaphragm that overlies the flanges surrounding the mouth thereof and which plate is adjustably fixed to the head by means which may act as a port for the admission of fluid under pressure to the interior of the diaphragm. This construction ensures a leak-proof diaphragm arrangement of relatively low cost and which may, with facility, be replaced when worn or damaged.

In another aspect of the invention, the base may be provided with parallel bars, each having a longitudinal flat formed therealong and which bars may extend substantially throughout the length of the base. C-clamp members of substantially the same length as the bars may be located on each side of the base in a manner so that the lower flange of each C-clamp may be held beneath is corresponding bar by a toggle link construction which, when activated, can oscillate the C-clamps about their corresponding bars through a limited angular motion. The movable head may include a surface over which the upper flange of each C-clamp may be moved when the toggle link construction is activated. The dimensions of these cooperating parts may be such that they may be moved into clamping position with ease when the flats formed on the bars are in engagement with the lower flanges of the C-clamp members. The bars may then be rotated so that the lower flanges of the C-clamp engage the cylindrical surface of the bars which effects camming of the C-clamp members in a direction to lock the head to the base of the machine.

In another aspect of the invention, hydraulic media may be supplied to the interior of the container-like diaphragm from a closed system including an air-oil booster of sufficient capacity to effectively perform the embossing operation. In this way a simplified hydraulic system is provided for actuating the apparatus without necessitating continuous flow of large volumes of liquid.

In still another aspect of the invention, a heating means may be provided in the base and may extend over any desired portion thereof for preheating the material and/or the die supported thereon.

The above as well as other objects and novel features of the invention will become apparent from the following specification and accompanying drawings which are merely exemplary.

Figure 1:
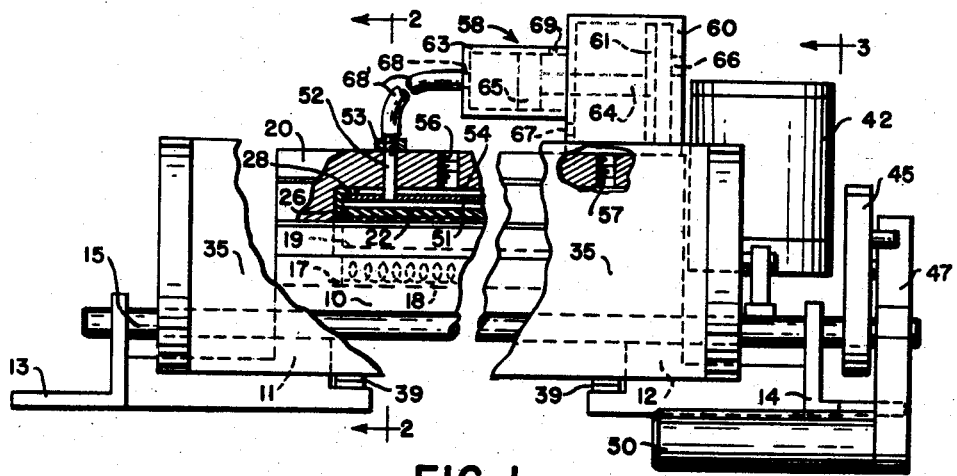
Fig. 1 is a front elevational view of an embossing machine to which the principles of the invention have been applied.

Referring to the drawings, the principles of the invention are shown as applied to an embossing machine including a die base 10 that may be supported on centering brackets 11 and 12 that are fixed to base angle members 13 and 14 at each end of the embossing machine. Parallel arranged cam locking rods 15 and 16 may extend between the angles 13 and 14 such that their tops are at the same elevation as the top of the centering brackets 11 and 12. Accordingly, the die base 10 is supported by the rods 15, 16 and brackets 11 and 12. It may be fixed to the centering brackets 11 and 12 to ensure against its lateral displacement.

The die base 10 may be provided with a cored-out or bored hole 17 extending longitudinally thereof and substantially throughout the length thereof. An electric heating coil 18 may be located within the hole 17 for elevating the temperature of the die base 10 and the dies therein as well as the material to be embossed if such is necessary or desirable.

A die nest 19 may be fixed to the die base 10 and it may support the embossing dies as well as the material to be embossed. A diaphragm head 20 may be located above the die base 10 for movement toward and from the die nest 19. The head 20 may include a recess 21 of any desired form, although in the embodiment disclosed, it is shown as rectangular. A diaphragm 22 may be received within said recess 21 and it may be provided with a wear sheet 23, both being held in place within the recess 21 by a wear strip retaining plate 24 that in turn is fixed to the head 20 by a clamp ring 25 bolted or otherwise fastened to the head 20.

The diaphragm 22 may include a thickened bottom wall 26 surrounded by four side walls 27, each of the latter of which includes inturned flange or lip portions 28 forming what might be termed a flanged, open-mouth, container-like diaphragm. The diaphragm 22 and wear sheet 23 may be made of any flexible material capable of withstanding the forces necessary to produce the embossing function, and preferably they are made of neoprene.

The retaining ring 24 and clamp ring 25 may be of rectangular shape having rectangular openings 29 and 30, respectively, therethrough. The rectangular opening 29 in the retaining plate 24 may be such as to provide a border around the embossing that is applied to the article treated. The opening 30 may be such as to loosely fit the die nest 19 fixed to the die base 10.

While the movement of the head 20 toward and away from the die base 10 may be effected by any suitable means, it is shown as being fixed to one end of one or more pivoted levers 31. Spacers 32 may surround screws 33 that extend from the one end of levers 31 and screw into the top of the head 20. The levers 31 may be pivoted at 34 to a stationary bracket (not shown), and the ends of said levers 31 opposite those connected to the head 20 may support adjustable counterweights 34' that will approximately balance the weight of the head 20 so that it may be manually raised and lowered with facility by an operator.

The head 20 must be rigidly held in contact with the die base 10 during the embossing process which involves the application of severe forces tending to separate the two. In the present embodiment of the invention this has been accomplished by providing substantially identical C-clamp members 35, only one of which will be specifically described.

The member 35 extends longitudinally of the machine and throughout substantially its entire extent. It may include parallel flange portions 36 and 37. The upper surface of flange 37 may engage the rod 15 while the lower surface of flange 36 may be located slightly above a surface 70 on head 20 in one condition of the apparatus. The clearance between flange 36 and surface 70 is made possible by a flat surface 38 being formed along rod 15 and against which the lower flange 37 is forced prior to the clamping operation by the action of a plurality of leaf springs 39 or other suitable means.

A toggle link 40 may have its one end connected to the member 35 and its opposite end connected to a piston rod 41, which latter may extend into a cylinder 42 and be connected to a piston 43 therein. The cylinder 42 may be mounted on brackets (not shown) that may extend upwardly from the supporting structure for the die base 10. The cylinder 42 may be provided with a port 44 through which air may be admitted and exhausted, and another port at the other end of cylinder 42 may be employed in a similar fashion.

Figures 2, 3:
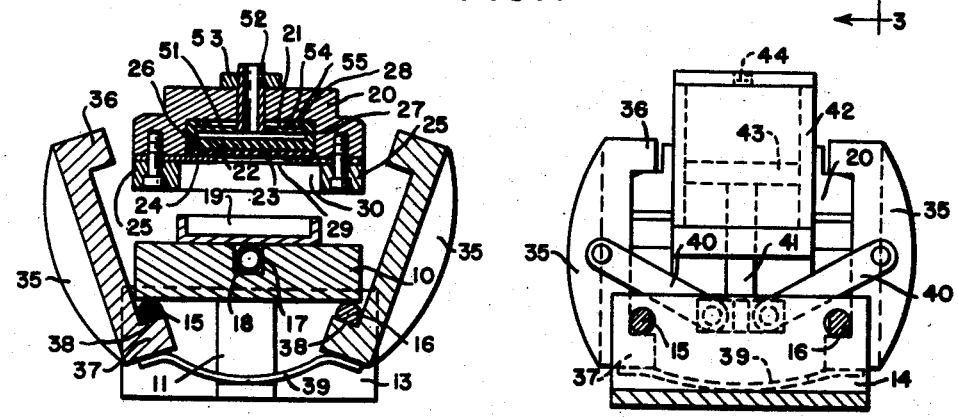
Fig. 2 is a sectional elevational view taken substantially along line 2—2 of Fig. 1, with the clamping means in ineffective position and the head in a partially raised position.
Fig. 3 is a sectional elevational view taken substantially along line 3—3 of Fig. 1 and showing the clamping means in effective position.
Figure 4:
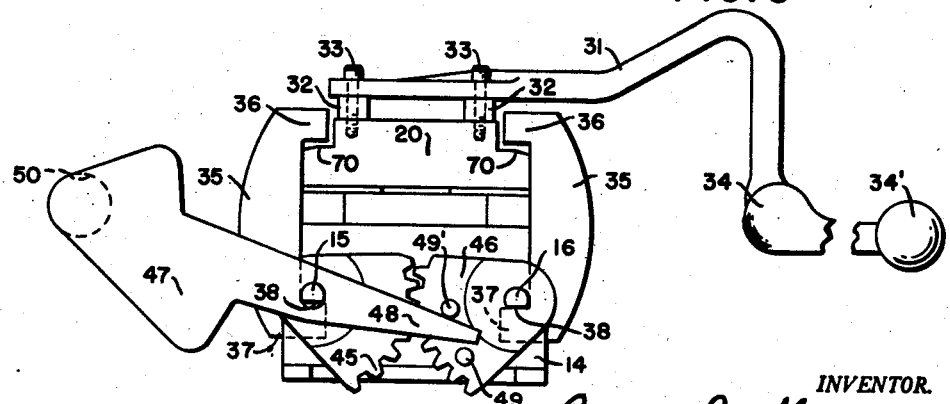
Fig. 4 is an end elevational view of the apparatus shown in Fig. 1, with the clamping means in position to be rendered effective.

From the foregoing it is evident that exhausting the air above piston 43 and admitting air under pressure to cylinder 42 beneath piston 43 will cause links 40 to force clamp members 35 to the position shown in Fig. 2. And, reversal of these conditions will cause the clamp members to move into the position shown in Fig. 4, so long as the flanges 37 engage the flats 38 on the bars 15 and 16.

In the embodiment disclosed, positive clamping of the head 20 to the base 10 is provided by simultaneously turning the bars 15 and 16 to cause the flats 38 thereof to move out of, and the cylindrical surfaces thereof to move into, engagement with the flanges 37, thereby forcing the clamp members 35 downwardly to effect engagement between flanges 36 and surfaces 70 on head 20.

In the embodiment disclosed this has been accomplished by fixedly mounting intermeshing gear means 45 and 46 to shafts 15 and 16. An operating lever 47 may be journaled on shaft 15 and may include a portion 48 that may cooperate with dogs or lugs 49, 49' on the gear means 46. Lever 47 may also include a handle 50 for effecting partial rotation of the gear means 45 and 46 to thereby cause the flats 38 on shafts 15 and 16 to be turned in a manner so that the peripheries of shafts 15 and 16 will effect binding of the head 20 to the base 10.

Referring again to Fig. 2, a plate 51 may be located within the diaphragm in a manner to overlie the inturned flange portions 28 thereof. The plate 51 may have one or more tubular elements 52 extending therethrough and integral therewith. The tubular elements 52 may extend through the top of the head 20 and be provided with threads thereon so that a nut 53 may be employed to draw the plate 51 toward a surface 54 of the diaphragm recess within head 20 and clamp the flange portions 28 of the diaphragm 22 into sealing engagement with surface 54. This construction provides a chamber 55 between the plate 51 and the surface 54 through which cooling liquid may be circulated by providing ports 56 and 57 through the top of head 20 opening into said chamber 55.

In order to activate the diaphragm 22 when it is clamped in operative position relatively to the die base 10, a simplified hydraulic system may be employed. It may include a combined pneumatic hydraulic booster means 58 within a closed hydraulic system. The booster means 58 may include a relatively large cylinder 60 within which a piston 61 is adapted to be mounted for reciprocation. A relatively small cylinder 63 may be mounted in alignment with cylinder 60, and a piston rod 64 connected to piston 61 may extend into cylinder 63 and have connected to it another piston 65 arranged to be reciprocated within cylinder 63. Ports 66 and 67 may be provided for cylinder 60 for alternately admitting air under pressure to, and exhausting opposite sides of, piston 61.

A port 69 in cylinder 63 may open to the atmosphere or to a sump, and a port 68 in cylinder 63 may be connected by a flexible line 68' to the passage within the tubular element or elements 52 which leads to the interior of the diaphragm 22.

The capacity of the cylinder 63 may be such as to more than equal the increased volume required within diaphragm 22 to produce the desired embossing or forming operation. Therefore, a closed hydraulic system may be employed including the oil within the cylinder 63 on the lefthand side of piston 65, that within the flexible line 68', and that within diaphragm 22. By applying air pressure to port 66 and exhausting through port 67, a force equal to the ratio of the differential areas of pistons 61 and 65 multiplied by the pressure of the air within cylinder 60 is applied to the oil within the closed system in pounds per square inch.

From the foregoing it is evident that the combination in a press of a booster means and a closed hydraulic system enables the use of a simplified system for actuating a press.

Although the various features of the new and improved press have been shown and described in detail to fully disclose one embodiment of the invention, it will be evident that numerous changes may be made in such details and certain features may be used without others without departing from the principles of the invention.

What is claimed is:

1. In a press, a die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; and means within said diaphragm for transmitting a force proportional to the pressure fluid therein to the flanges of said diaphragm to form a seal between said flanges and said head.

2. In a press, a die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; and a coolant chamber between said means and said head within which cooling fluid is adapted to be circulated.

3. In a press, a die base; a diaphragm head adapted to be moved into and out of cooperating position relatively to said die base, said head including side wall means and an end wall forming a chamber with said side wall means, the other end of said chamber opening in a direction facing said die base; a container-like flexible diaphragm within said chamber presenting a flexible force exerting surface across the open end of said chamber and including inturned flanges in contact with said end wall; and means within said diaphragm for transmitting a force proportional to the pressure fluid therein to said flanges to force them into sealing relation with said end wall.

4. In a press, a die base; a diaphragm head adapted to be moved into and out of cooperating position relatively to said die base, said head including side wall means and an end wall forming a chamber with said side wall means, the other end of said chamber opening in a direction facing said die base; a container-like, flexible diaphragm within said chamber presenting a flexible force exerting surface across the open end of said chamber and including inturned flanges in contact with said end wall; a plate within said diaphragm and overlying the flanges of said diaphragm; tubular means integral with said plate and extending through said head; means for drawing said tubular means and said plate toward said end wall; and means for supplying liquid under pressure through said tubular means to the interior of said chamber.

5. In a press, a die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; a separate flexible wear sheet over said flexible force exerting surface; and means for retaining said wear sheet in position relatively to said diaphragm.

6. In a press, a die base; a diaphragm head adapted to be moved into and out of cooperating position relatively to said die base; clamping means adapted loosely to be moved into clamping position relatively to said base and head; and releasable camming means constituting the sole means for rendering effective and ineffective said clamping means.

7. In a press, a longitudinally extending die base; a longitudinally extending diaphragm head overlying a substantial portion of said die base; longitudinally extending, parallel bars on each side of said die base; longitudinally extending C-clamp members on each side of said base with one flange in engagement with one of said bars and the other flange overlying in slight spaced relation, a portion of said head; means for pivoting said clamp members about said bars; and means on said bars for taking up said slight spaced relation and forcing said clamp members against said head.

8. In a press, a longitudinally extending die base; a longitudinally extending diaphragm head overlying a substantial portion of said die base; longitudinally extending, parallel bars on each side of said die base; longitudinally extending C-clamp members on each side of said base with one flange in engagement with one of said bars and the other flange overlying in slight spaced relation, a portion of said head; toggle links connected to said clamp members and also to a piston rod; means for reciprocating said piston rod; and means on said bars for taking up said slight spaced relation and forcing said clamp members against said head.

9. In a press, a longitudinally extending die base; a longitudinally extending diaphragm head overlying a substantial portion of said die base; longitudinally extending, parallel bars on each side of said die base; longitudinally extending C-clamp members on each side of said base with one flange in engagement with one of said bars and the other flange overlying in slight spaced relation, a portion of said head; means for pivoting said clamp members about said bars; longitudinally extending flats formed on said bars for cooperation with said clamp members to provide said slight spaced relation; and means for turning said bars whereby said slight spaced relation is taken up and said clamp members are forced against said head.

10. In a press, a longitudinally extending die base; a longitudinally extending diaphragm head overlying a substantial portion of said die base; longitudinally extending, parallel bars on each side of said die base; longitudinally extending C-clamp members on each side of said base with one flange in engagement with one of said bars and the other flange overlying in slight spaced relation, a portion of said head; toggle links connected to said clamp members and also to a piston rod; means for reciprocating said piston rod; longitudinally extending flats formed on said bars for cooperation with said clamp members to provide said slight spaced relation; and means for turning said bars whereby said slight spaced relation is taken up and said clamp members are forced against said head.

11. In a press, a die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; a closed hydraulic circuit including said container-like diaphragm; and a booster within said circuit for activating said diaphragm.

12. In a press, a die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; a closed hydraulic circuit including said container-like diaphragm; an accumulator in said circuit including a reciprocable piston within a cylinder; and a pneumatically operated piston of much larger size than said accumulator piston for operating said accumulator piston.

13. In a press, a die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; a coolant chamber between said means and said head within which cooling fluid is adapted to be circulated; a closed hydraulic circuit including said container-like diaphragm; and a booster within said circuit for activating said diaphragm.

14. In a press, a die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; clamping means adapted loosely to be moved into clamping position relatively to said base and head; and releasable camming means constituting the sole means for rendering effective and ineffective said clamping means.

15. In a press, a die base; a diaphragm head adapted to be moved into and out of cooperating position relatively to said die base, said head including side wall means and an end wall forming a chamber with said side wall means, the other end of said chamber opening in a direction facing said die base; a container-like, flexible diaphragm within said chamber presenting a flexible force exerting surface across the open end of said chamber and including inturned flanges in contact with said end wall; means within said diaphragm for transmitting a force proportional to the pressure fluid therein to said flanges to force them into sealing relation with said end wall; clamping means adapted loosely to be moved into clamping position relatively to said base and head; and releasable camming means constituting the sole means for rendering effective and ineffective said clamping means.

16. In a press, a die base; a diaphragm head adapted to be moved into and out of cooperating position relatively to said die base, said head including side wall means and an end wall forming a chamber with said side wall means, the other end of said chamber opening in a direction facing said die base; a container-like, flexible diaphragm within said chamber presenting a flexible force exerting surface across the open end of said chamber and including inturned flanges in contact with said end wall; a plate within said diaphragm and overlying the flanges of said diaphragm; tubular means integral with said plate and extending through said head; means for drawing said tubular means and said plate toward said end wall; means for supplying liquid under pressure through said tubular means to the interior of said chamber; clamping means adapted loosely to be moved into clamping position relatively to said base and head; and releasable camming means constituting the sole means for rendering effective and ineffective said clamping means.

17. In a press, a die base; a heater within said die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; and a coolant chamber between said means and said head within which cooling fluid is adapted to be circulated.

18. In a press, a die base; a heater within said die base; a diaphragm head adapted to be moved into and out of cooperating position relatively to said die base and including means for supplying fluid under pressure to a diaphragm held thereby; a flanged, open-mouth, flexible, container-like diaphragm within a cavity formed in said head, and arranged so that it presents a flexible force exerting surface opposite said die base; means within said diaphragm for transmitting a force proportional to the pressure fluid therein to the flanges of said diaphragm to form a seal between said flanges and said head; a coolant chamber between said means and said head within which cooling fluid is adapted to be circulated; a closed hydraulic circuit including said container-like diaphragm; and a booster within said circuit for activating said diaphragm.

References Cited in the file of this patent

UNITED STATES PATENTS

| | | |
|---|---|---|
| 1,740,399 | Grunberg | Dec. 17, 1929 |
| 2,597,404 | Teske | May 20, 1952 |